United States Patent
Kulkarni et al.

(10) Patent No.: US 9,956,537 B2
(45) Date of Patent: May 1, 2018

(54) TUBE IN TUBE CONTINUOUS GLASS-LINED REACTOR

(71) Applicant: COUNCIL OF SCIENTIFIC & INDUSTRIAL RESEARCH, Rafi Marg, New Delhi (IN)

(72) Inventors: Amol Arvind Kulkarni, Pune (IN); Vivek Vinayak Ranade, Pune (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 32 days.

(21) Appl. No.: 15/103,735

(22) PCT Filed: Dec. 12, 2014

(86) PCT No.: PCT/IN2014/000773
§ 371 (c)(1),
(2) Date: Jun. 10, 2016

(87) PCT Pub. No.: WO2015/087353
PCT Pub. Date: Jun. 18, 2015

(65) Prior Publication Data
US 2016/0303538 A1    Oct. 20, 2016

(30) Foreign Application Priority Data

Dec. 12, 2013    (IN) .......................... 3622/DEL/2013

(51) Int. Cl.
*B01J 19/02* (2006.01)
*B01J 19/24* (2006.01)
(Continued)

(52) U.S. Cl.
CPC ............. *B01J 19/02* (2013.01); *B01J 19/242* (2013.01); *F28D 7/106* (2013.01); *F28D 7/12* (2013.01); *F28F 9/26* (2013.01); *F28F 19/02* (2013.01); *B01J 2219/0002* (2013.01); *B01J 2219/00033* (2013.01); *B01J 2219/00078* (2013.01);
(Continued)

(58) Field of Classification Search
CPC ...... B01J 19/02; B01J 19/242; B01J 19/2425; B01J 19/244; B01J 2219/0209; B01J 2219/0002; B01J 2219/00033; B01J 2219/00078; B01J 2219/00081; B01J 2219/00085
See application file for complete search history.

(56) References Cited

U.S. PATENT DOCUMENTS 2,394,291 A * 2/1946 Calcott .................. C08F 36/18
                                                        422/138
3,858,051 A    12/1974 Smith
(Continued)

FOREIGN PATENT DOCUMENTS

| EP | 2290313 A1 | 3/2011 |
|---|---|---|
| JP | 2010/32089 | 2/2010 |
| NL | 7611207 | 4/1977 |

*Primary Examiner* — Lessanework Seifu
(74) *Attorney, Agent, or Firm* — John P. White; Cooper & Dunham LLP

(57) ABSTRACT

A tube in tube continuous glass lined metal reactor includes: concentric tubular segments; (a) outer glass lined tube and (b) an inner glass lined segment disposed in the outer glass lined tube, defining thereby an intermediate glass lined region between the inner segment and the outer tube.

10 Claims, 13 Drawing Sheets

(51) Int. Cl.
 *F28F 19/02* (2006.01)
 *F28D 7/10* (2006.01)
 *F28D 7/12* (2006.01)
 *F28F 9/26* (2006.01)

(52) U.S. Cl.
 CPC ............... *B01J 2219/00081* (2013.01); *B01J 2219/00085* (2013.01); *B01J 2219/0254* (2013.01)

(56) References Cited

U.S. PATENT DOCUMENTS

| | | |
|---|---|---|
| 4,044,068 A | 8/1977 | Kurtz |
| 5,331,841 A * | 7/1994 | Beaver ................ B01J 19/0053 73/40.7 |
| 2011/0030933 A1 | 2/2011 | Catelli et al. |
| 2011/0139415 A1 | 6/2011 | Seryi et al. |
| 2013/0156504 A1 | 6/2013 | McAlister |

* cited by examiner

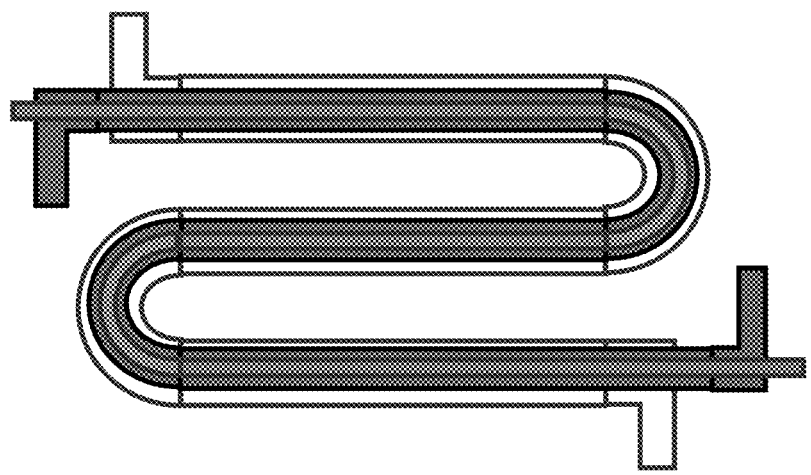
Fig: 15

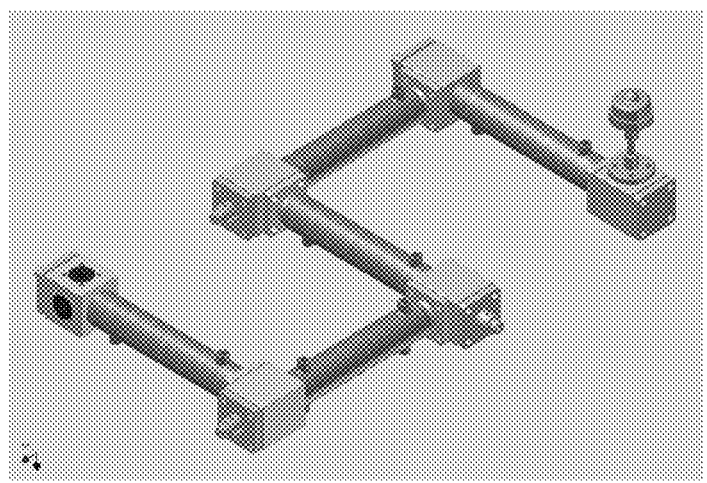
Fig: 16

TUBE IN TUBE CONTINUOUS GLASS-LINED REACTOR

TECHNICAL FIELD OF INVENTION

This invention relates to a corrosion resistant, continuous glass lined metal reactor. Particularly, the invention discloses a tube in tube type continuous glass lined reactor with enhanced heat transfer efficiency.

BACKGROUND AND PRIOR ART

Glass lined agitated reactors are widely used by fine chemicals and pharmaceutical industry. Heat transfer area is one of the key criteria that determine the efficiency of a process, which in turn depends on the type of equipment used. These conventional glass lined reactors have very limited heat transfer area, in the range of typically 3 to 5 $m^2/m^3$ of reactor, wherein heat transfer area is estimated as [(perimeter×height)/(cross-sectional area×height)] and expressed as sq meter/cubic meter.

Stirred tank reactors (STRS) used in pharmaceutical and fine chemical industries are designed for providing and removing heat. This is done with coil or half coil with coolant passing through it, or using jacketed tanks. STRs with jacket or coils have heat transfer area of 60-80 ($m^2/m^3$). Further the improvement of heat transfer in stirred tanks cooled by helical coils is reported by Braz. J. Chem. Eng. vol. 20 no. 2 São Paulo April/June 2003. An improved reactor system for the carrying out of exothermic reactions of a gas or liquid, is disclosed in EP 0974395, additionally stirred-tank reactor and method for carrying out a polymerisation reaction is well established in U.S. Pat. No. 8,148,480.

To increase area, coils are immersed in the reactors. But coils occupy space, so size of tank has to be increased. Though heat transfer obtained is about 150 $m^2/m^3$, there is a limit up to which tanks sizes can be increased.

Glass lined reactors are needed for toxic and corrosive chemicals, but heat conductivity is compromised due to the low heat conductivity of glass. Therefore, reactions are carried out for very long periods of time, which is not desirable, especially when toxic chemicals have to be handled. SS reactors cannot be used to overcome this since they erode or corrode.

These limitations on heat transfer area as well as the absolute necessity to use glass lined reactors for toxic chemicals often compel industries to conduct reactions at lower temperature. This causes longer batch/residence times (more capital cost per unit product), lower yield and higher utility requirements (more operating costs per unit product).

The concentric tubes are employed in heat exchangers to improve the heat exchange/transfer rate, whereas the toxic and corrosive chemical reactions restrain the scope of the reactor. Some of the concentric tube reactors are listed herein, the Double-Pipe Heat Exchanger' is reported by Jeffrey B. Williams in Project No. 1H Laboratory Manual Sep. 18, 2002.

Further triple tube heat exchanger is demonstrated in US 20100300663, whereas high-throughput microporous tube-in-tube microreactor described by Jian-Feng Chen et al. in *AIChE Journal Volume* 57, *Issue* 1, pages 239-249, January 2011.

To overcome the drawbacks of available reactors with regard to poor heat transfer area, limited scope of reactions, but yet retain the ability to perform reactions with toxic chemicals in glass lined reactors, the inventors have proposed a novel tube-in-tube glass lined reactor.

OBJECTS OF INVENTION

The object of the invention is to provide a glass lined reactor with a high heat transfer area in continuous flow operation or a component of which can be used for better heat management in a stirred tank reactor (batch or continuous).

Another object of the invention is to provide a reactor with high value of heat transfer and yet is possible to process toxic and corrosive chemicals in it.

SUMMARY OF INVENTION

The present invention relates to a corrosion resistant, tube in tube in tube continuous glass-lined metal reactor, wherein the reactor comprising three concentric tubular segments (a) inner glass lined tubes; (b) intermediate glass lined tube; and (c) outer glass lined tube]; wherein the heat transfer fluid flows in the areas of segment and, and reactant flows between the inner and outer glass lined tubes or their annulus.

The invention discloses a novel glass lined tube-in-tube micro mixer or micro reactor with improved surface area and improved heat transfer efficiency.

In an aspect, the invention provides tube-in-tube continuous glass-lined reactor comprises at least two concentric tubes, wherein the heat transfer fluid flows within component [104] and [105] and the reactant flow between the said glass lined tubes or their annulus, wherein the metal surfaces that come in contact with said reactant are lined with glass.

BRIEF DESCRIPTION OF DRAWINGS

Description of the Parts

The instant glass lined tube-in-tube micro mixer or micro reactor comprises the following parts;

| Sr No | Part | Part name |
|---|---|---|
| 1 | 100 | Glass lined micro reactor |
| 2 | 101 | Measurement ports |
| 3 | 101A | Inside part of port |
| 4 | 102 | Connecting ports |
| 5 | 103 | Ports for connecting sections |
| 6 | 104 | Outer glass lined segment or peripheral fluid transport section of micro reactor |
| 7 | 105 | Inner glass lined insertion segment or peripheral fluid transport section of micro reactor |
| 10 | 202, 203 | O-rings, Gaskets |
| 11 | 204, 205 | Glass lined inner surface of solid metal block of connection port, 102 |
| 12 | 401 | inlet of segment [104] for process fluid |
| 13 | 402 | Inlet of segment [104] for thermic or heat transfer fluid 104 |
| 14 | 403 | Outlet of segment [104] for thermic or heat transfer fluid |
| 15 | 404 | Connection to a closure flange [503] |
| 16 | 405 | Outlet of segment [104] for process fluid |
| 17 | 406 | outer wall of the segment [104] |
| 18 | 407 | Flow path for thermic fluid or heart transfer fluid through outer segment [104] |
| 19 | 408 | Glass lined Inner wall of the of the segment [104] |
| 20 | 409 | glass lined inner surface of inner wall [408] for the process fluid path |
| 21 | 410 | Connecting flanges connecting 405 and 102 |
| 22 | 501 | Outlet of the segment [105] |
| 23 | 502 | Inlet of the segment [105] |

-continued

| Sr No | Part | Part name |
|---|---|---|
| 24 | 503 | Connecting flanges for connecting the segment [105] and connector 102 |
| 25 | 504 | outer tube of the the segment [105] |
| 26 | 505 | End of the segment [105] |
| 27 | 506 | Straight tube |
| 28 | 507 | flow path of thermic or heat transfer fluid through inner segment [105] |
|    | 508 | glass lined outer surface of the outer tube [504] of the segment [105] |
| 29 | 600 | Flow path for reaction or process fluid |
| 30 | 700 | Assembly of micromixer/microreactor in round shape |
| 31 | 701 | Vertical support for micromixer/microreactor in round shape |

Figure 1:
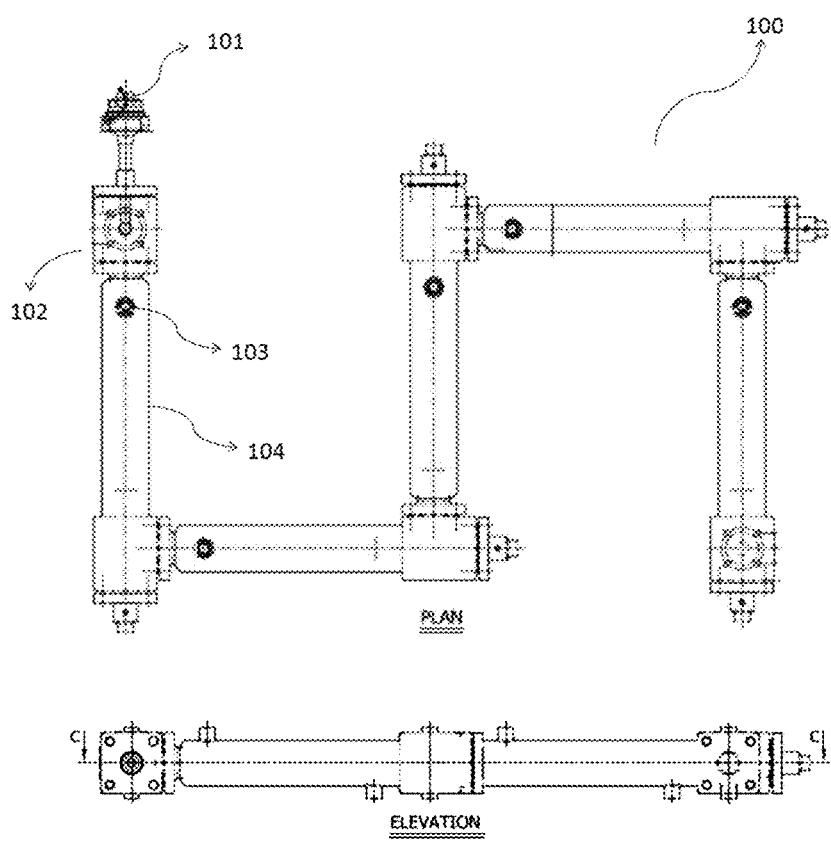

FIG. 1: The assembly of tube-in-tube glass lined reactor [100] comprises repetitive structures either in series or in parallel of connecting ports [102], measurement ports [101], the outer glass lined peripheral fluid transport sections [104] and the ports for connecting two [104] type of sections for transfer of heat transfer fluid from the outer most section. The cross-section of elevation along C-C plane is shown in FIG. 2.

Figure 2:
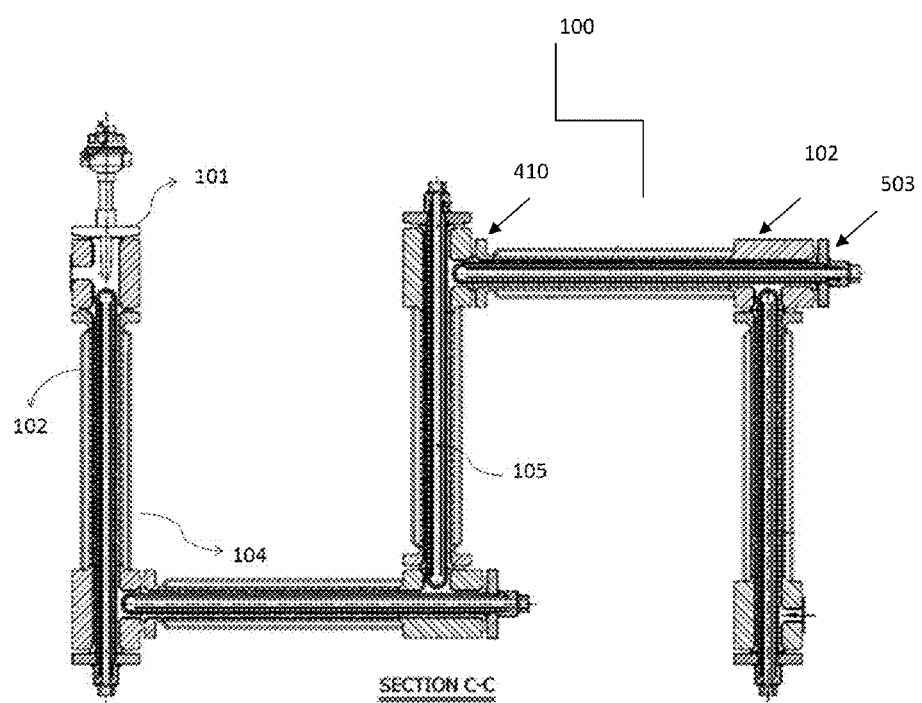

FIG. 2: Section C-C of the elevation of FIG. 1 shows the details of the internal components of the tube-in-tube glass lined reactor assembly. The assembly comprises repetitive structures either stand-alone or assembled using connecting ports [102] in series or in parallel, measurement ports [101], the outer glass lined peripheral fluid transport sections [104] and the ports [103] for connecting two [104] type of segments or inner glass-lined tube [105].

Figure 3:
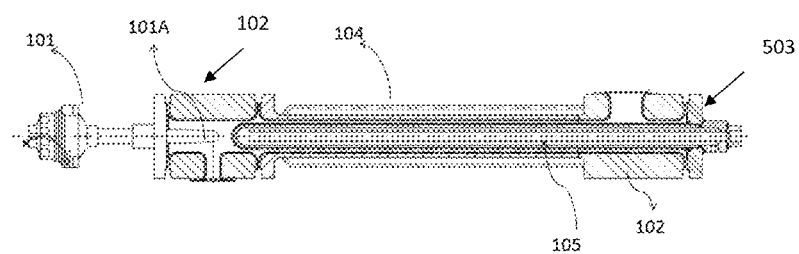

FIG. 3: A typical connected assembly comprising of stand-alone connecting port [102], measurement port [101] showing the details of section reaching inside the port [101A], the outer glass lined peripheral fluid transport sections [104] and inner glass-lined insertion tube [105].

Figure 4:
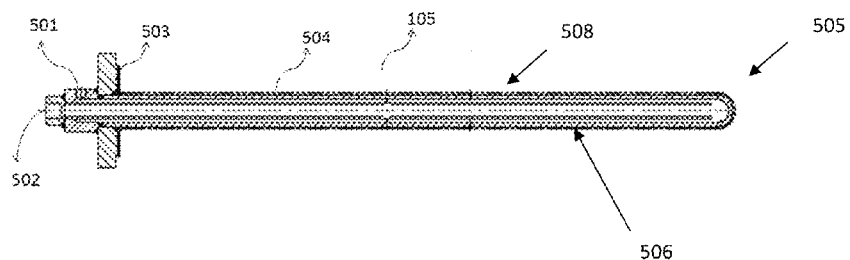

FIG. 4: A typical inner glass-lined insertion tube [105] comprises of glass lining from outer surface [508], an inlet [502] and an outlet [501] for the heat transfer fluid and it may optionally be connected to the port [102] using flange [503]. The heat transfer fluid entering from inlet [502] flows till the end [505] of the tube and then changes its direction at the end through an annular section created using a straight tube [506] which brings the heat transfer fluid to flow till the outlet [501]. Outlet port of an inner glass-lined insertion tube [105] is connected to the inlet port of another inner glass-lined insertion tube [105] externally using flexible or inflexible connections.

Figure 5:
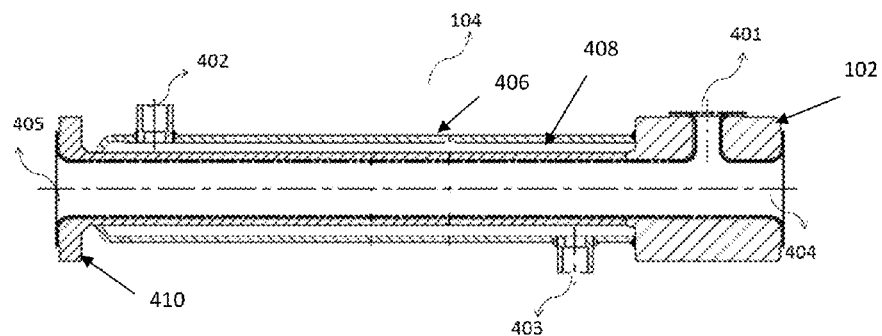

FIG. 5: A typical outer glass-lined peripheral tube [104] comprises of glass lining on inner surface, an inlet [401] and an outlet [405] for the process fluid and it can be connected to the port [102] using flange [410]. The heat transfer fluid entering from inlet [402] flows out through [403]. Outlet port [403] is connected to the inlet port [402] of another [104] segment externally using flexible or inflexible connections.

Figure 6:
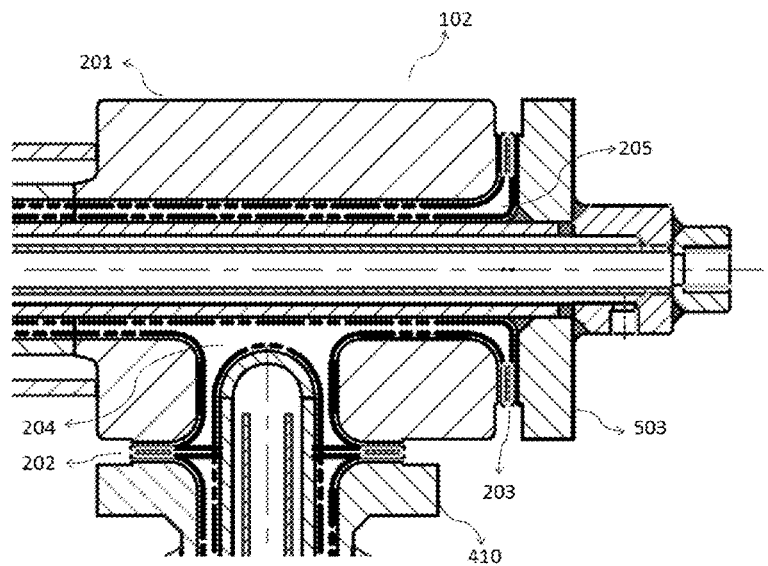

FIG. 6: A typical connection port [102] comprises of a solid metal block with glass lined inner surface [204] and [205], which is connected to the segments [104] and [105] using flanges [503] and [410] using gaskets or o-rings [204] and [203], respectively.

Figure 7:
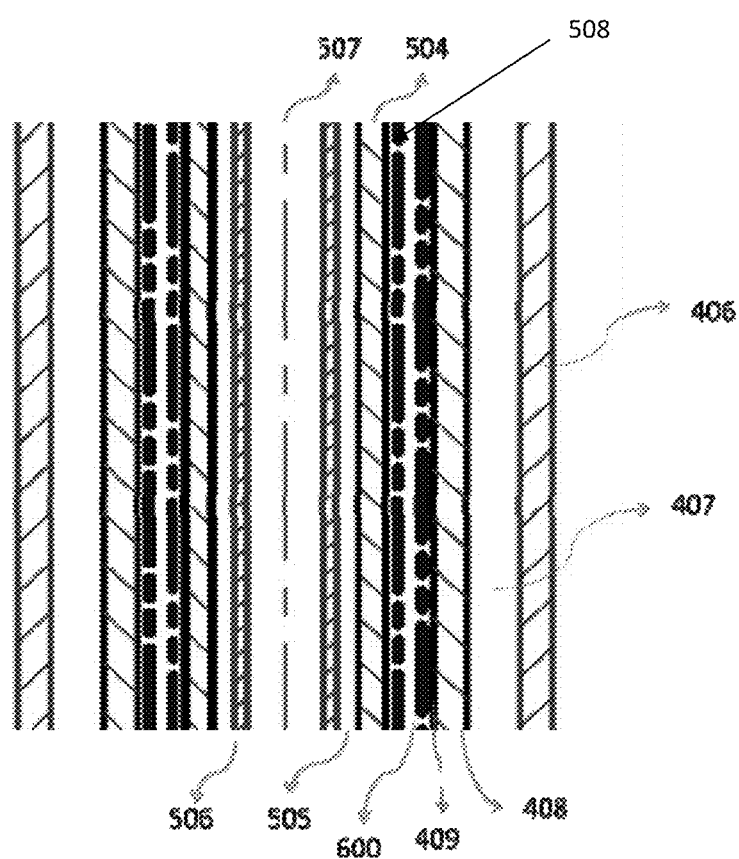

FIG. 7: Cross-section of the typical segment [104] assembled with segment [105] of the glass-lined tube-in-tube reactor assembly. Heat transfer fluid flows [407] between outer wall [406] and inner wall [408] of jacketed section of the outer segment [104]. The inner surface [409] of the inner wall [408] which does not touch the heat transfer fluid is glass-lined. Outer most surface [508] of [105] is glass lined and comes in contact with the process fluid [600].

Figure 8:
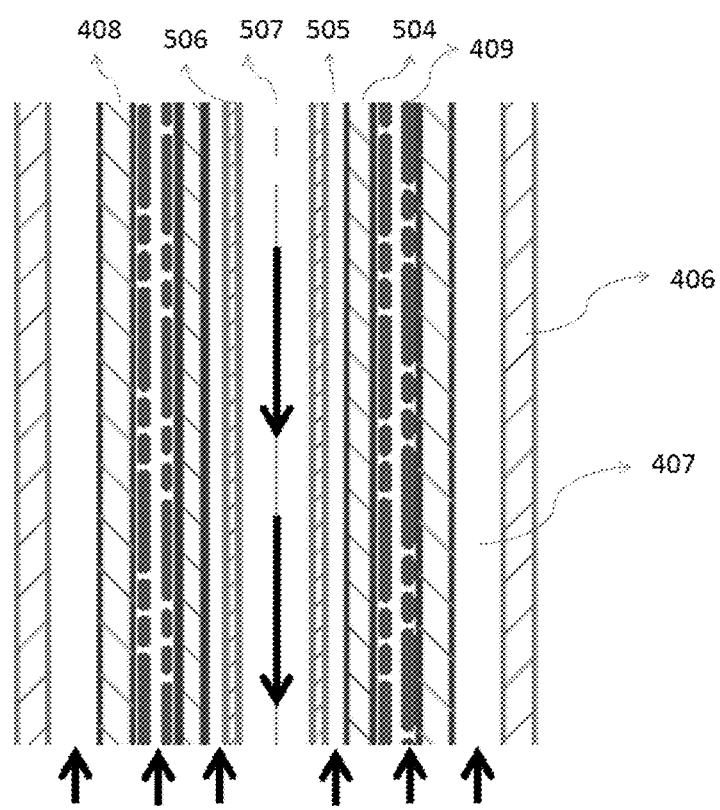

FIG. 8: Co-current mode of flow of process fluid [600] and the heat transfer fluids [407, 507] in [104] and [105].

Figure 9:
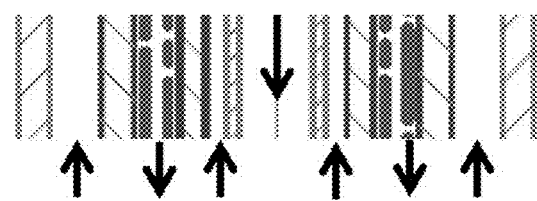

FIG. 9: Counter-current mode of flow of process fluid [600] and the heat transfer fluids [407, 507] in [104] and [105].

Figure 10:
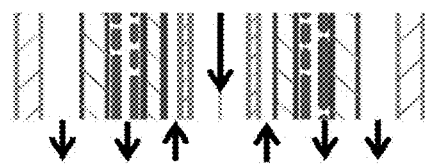

FIG. 10: Mixed flow mode of flow of process fluid [600] and the heat transfer fluids [407, 507] in [104] and [105].

Figure 11:
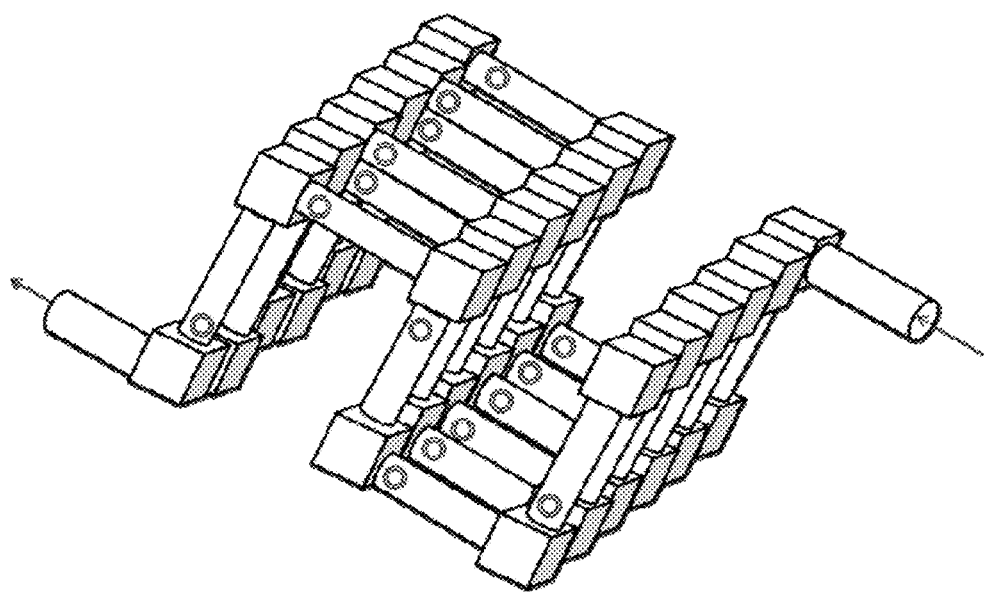

FIG. 11: Assembly of structures shown in FIG. 1 in series.

Figure 12:
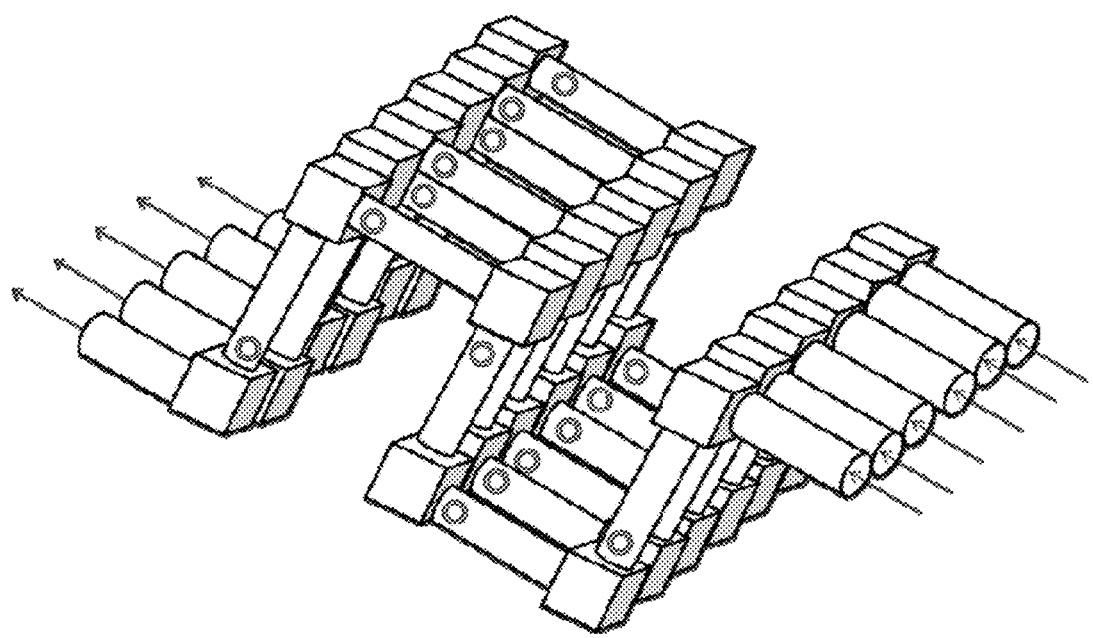

FIG. 12: Assembly of structures shown in FIG. 1 in parallel.

Figure 13:
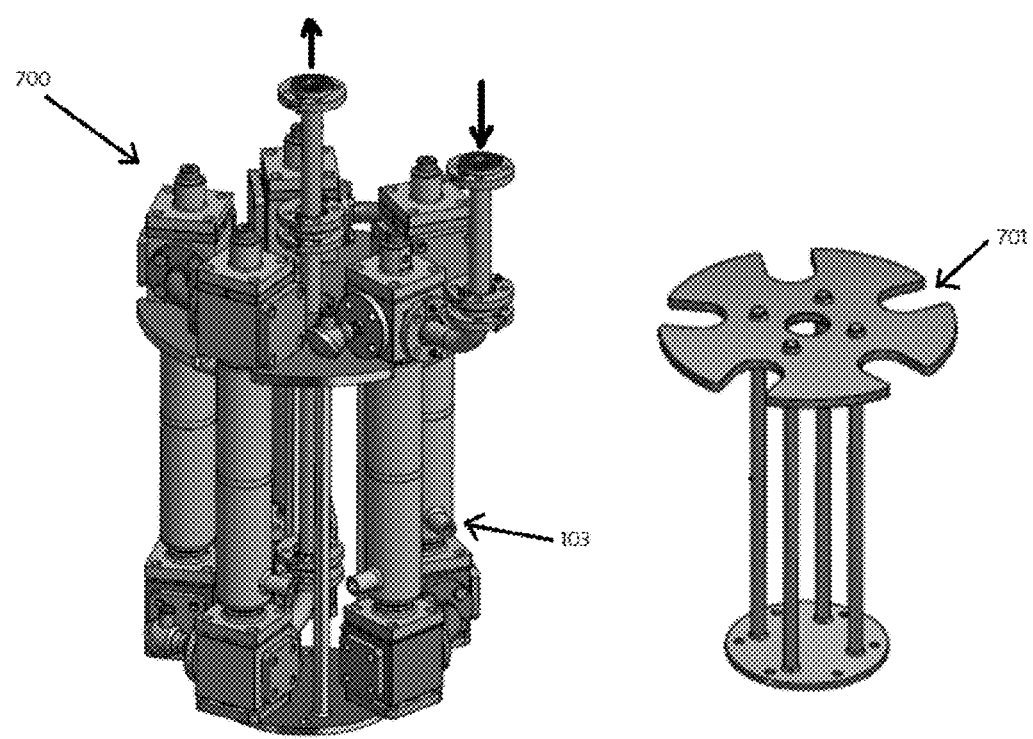

FIG. 13: Assembly of structures shown in FIG. 3 in round shape (700) along a vertical support (701).

Figure 14:
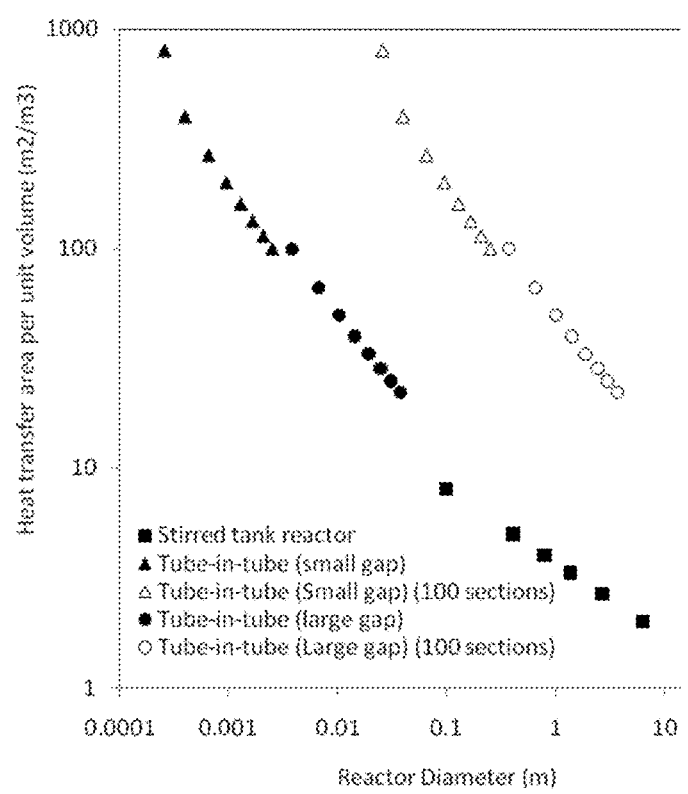

FIG. 14: Values of the heat transfer area per unit volume vs. volume of the standard glass lined stirred tank reactor and the glass-lined tube-in-tube reactor (single as well as multiple (100) achieved by using more in number). Small gap (1 cm) and large gap (2 cm) refer to the gap in the annulus between [408] and [504].

FIG. 15: Schematically representation of a continuous glass lined pipe flow device which has three tubular segments (60 cm length) with the smallest (inner most: shown in blue) being ½" tube which is glass lined from outer side. This one will be inserted in an internally glass lined tube of 1" diameter (shown in brown). This tube will be used for carrying out the reaction and will be enclosed inside another tube of 1.5" or 2" diameter (shown in white) which will carry the heat transfer fluid. Thus the heat transfer fluid will flow in the areas shown in blue and white while the reaction will take place in the brown area.

FIG. 16: Assembly design of the continuous glass lined pipe flow reactor.

DETAILED DESCRIPTION OF INVENTION

The invention will now be described in detail in connection with certain preferred and optional embodiments, so that various aspects thereof may be more fully understood and appreciated.

For the purpose of this invention, the expression 'reactor' or 'device' or 'assembly design' or 'heat exchanger' are used interchangeably throughout the specification and the same may be appreciated as such by the person skilled in the art.

The invention relates to corrosion resistance concentric tubes glass lined metal reactor with enhanced heat transfer efficiency for continuous flow operations.

In preferred embodiment, the present invention discloses a novel glass lined reactor configuration which may provide at least two orders of magnitude larger heat transfer area (~300 m²/m³ of reactor) and therefore eliminates most of the limitations of conventional glass lined reactors without compromising its ability to handle very corrosive process materials. The large heat transfer area helps to achieve rapid heat transfer. The heat transfer area per unit volume is estimated based on the dimensions of the different domains in the system.

The proposed solution has the following main components (a) tube-in-tube type arrangement for high heat transfer area, (b) an insertion segment having outer surface being glass lined while the inner surfaces are suitable for flowing the heat transfer fluids, (c) glass-lined metal parts for the reaction side to handle the corrosive and toxic chemicals.

Accordingly, the present invention provides a tube in tube type continuous glass-lined metal reactor, comprising a) an outer glass lined segment [104];
b) an inner glass lined segment [105] disposed in the outer glass lined segment [104] thereby defining an intermediate glass lined region; wherein reactant flows through the intermediate glass lined region and the heat transfer fluid flows through regions other than the intermediate region of the outer glass lined segment [104] and the inner glass lined segment [105].

In an embodiment of the present invention the outer glass lined segment [104] has a tubular construction, comprising: an outer wall (406) and an inner wall (408) defining a jacketed section there between and the jacketed section comprising and inlet [402] and outlet [403] for supplying heat transfer fluid.

In another embodiment of the present invention the outer glass-lined tube [104] is provided with glass lining on inner surface of the inner wall [408].

In still another embodiment of the present invention the outer glass lined segment [104] comprising inlet [401] and an outlet [405] for supplying the process fluid through interior through interior region surrounded by the inner wall [408].

In yet another embodiment of the present invention the inner glass-lined segment [105] has a tubular construction comprising an outer tube [504] and a straight inner tube [506] being inserted in the outer tube [504] so as to define an annular section there between.

In a further embodiment of the present invention the outer surface of the outer tube of the inner glass-lined segment [105] is provided with glass lining.

In a further more embodiment of the present invention the inner glass-lined segment [105] is assembled with the outer glass lined segment [104] using a port [102].

In an embodiment of the present invention the regions of outer glass lined segment and the inner glass lined segment through which the heat transfer fluid flows provides heat transfer area at least 300 $m^2/m^3$, for use in single phase and multiphase exothermic and endothermic reactions.

In another embodiment of the present invention the port [102] having one or more opening for single point or multi point feeding.

In still another embodiment of the present invention the reactor comprises a periodic and aperiodic sequence of assembly of the outer and inner segments [104, 105].

In yet another embodiment of the present invention the port [102] is made of metal selected from the group consisting of Mild steel, stainless steel, carbon steel and other metal alloys.

In one more embodiment of the present invention the reactor is fabricated in macro and micro form.

The following description describes the present invention with reference to the accompanying Figures.

FIG. 1 illustrates and assembly of tube-in-tube glass lined reactor [100] according an embodiment of the present invention. FIG. 2 shows a cross-sectional view taken along plane C-C of the assembly shown in FIG. 1. As shown in FIGS. 1 and 2, the reactor (100) comprises repetitive structures either stand alone or connected in series/parallel connections of connecting ports [102], measurement ports [101], the outer glass lined segment [104], the ports [103] for connecting two outer glass lined segment [104] [for transfer of heat transfer fluid from the outer most segment and inner glass-lined tube [105].

Referring to FIGS. 1 and 2, the assembly of glass lined reactor (100) can be connected with other similar assemblies using an insertion segment (105). The assembly (100) can be constructed by assembling outer segment (104) and insert segment (105). The configuration or assembly with only inserting segment [105] will provide relatively lower heat transfer area than the configuration (100) that uses outer segment [104] and the insertion segment [105].

FIG. 3 illustrates a typical assembly comprising of the stand-alone connecting port [102], measurement port [101] showing the details of section [101A] reaching interior of the port [102], the outer glass lined segment [104], the inner glass-lined insertion segment/tube [105] and a port [102] assembling the inner glass-lined insertion segment [105] with the outer glass lined segment [104].

The structure as shown in FIG. 3 can be assembled using the connectors to achieve assembly of the reactor (100) as shown in FIG. 1. As can be clearly understood, the assembly shown in FIG. 1 is a modular structure.

The entire structure as shown in FIG. 3 can be assembled to yield a structure as shown in FIG. 1 and replicated in stacks as shown in FIG. 11 and FIG. 12, where the system can be used either in series or in parallel, respectively.

Referring to FIG. 12, an assembly of components (104) can be immersed in a stirred reactor for removing heat from a toxic and corrosive media.

In addition to the application for carrying out reactions, the device mentioned herein also can be used for pre-heating of reactants or quenching of reactions by rapid heat transfer.

In another embodiment, the glass lined continuous reactor of the invention comprises two concentric tubes, with heat transfer fluids contained in them. In between the tubes, the reactant is present and reaction occurs. The surfaces that come in contact with the reactants or process fluids are glass lined.

In an embodiment the heat transfer area in hundreds of $m^2/m^3$, preferably ranges from 300-500 $m^2/m^3$.

Further the disclosed invention is useful to carry out reactions either in batch (with recirculation) or in continuous mode of operations for single phase as well as multiphase flows.

According to an embodiment, in the glass-lined tube-in-tube reactor, sections [104] and [105] in the reactor have variable length (0.1 m-20 m), diameter (0.01 m-1 m), annular space (0.001 m-0.1 m) and surface roughness, connected to each other in the same axis of symmetry with both [104 and 105] with single or multiple inlets for the assembly.

In another embodiment, in the glass-lined tube-in-tube reactor the section [104] is in combination with sections [104] having different diameter (0.01-1 m) and length (0.1 m-20 m) and with or without section [105], wherein the outer diameter of [105] is smaller than the inner diameter of glass-lined surface of [104] inside the volume occupied by [104] with identical axis of symmetry. In one more embodiment, in the glass-lined tube-in-tube reactor a periodic and aperiodic sequence of segments [104] and assembly of [104], [105] and [102] of suitable connecting diameters are connected with ports [102] having single point or multi point feeding system. In the glass-lined tube-in-tube reactor, a periodic and aperiodic sequence of segments [104] and assembly of [104], [105] and [102] of suitable connecting diameters in series [100] can be used. In the instant reactor assembly the connecting ports or joints in between the various arms are optional. The connecting ports may be employed for expanding the reactor by connecting with similar or different devices.

Further the periodic and aperiodic sequence of segments [104] and assembly of [104], [105] and [102] with suitable connecting diameters in series with different pitch and with similar and different tube diameter at 90 degrees can also be used as shown in FIG. 12 and otherwise (as shown in FIG. 13).

Referring to FIGS. 3 and 4, a typical connected assembly comprising of stand-alone connecting port [102], measurement port [101] inside part [101A] of the measurement port, the outer glass lined peripheral fluid transport segment [104] and inner glass-lined insertion tube/segment [105].

FIG. 4 illustrates a typical inner glass-lined insertion segment [105]. The inner glass-lined insertion segment is a tube [105] comprising a outer tube [504] and straight inner tube [506] being inserted in the outer tube [504] so as to define an annular section there between. Outer surface [508] of the outer tube [504] is provided with glass lining. The inner glass-lined insertion tube [105] is provided with an inlet [502] and an outlet [501] for the heat transfer fluid. The outlet [501] may optionally be connected to the port [102] using flange [503]. The heat transfer fluid entering from inlet [502] flows till closed end [505] of the tube [105] and then changes its direction at the end [505] through the annular section created using the straight tube [506] which brings the heat transfer fluid to flow till the outlet [501]. Outlet port of an inner glass-lined insertion tube [105] can be connected to the inlet port of another inner glass-lined insertion tube [105] externally using flexible or inflexible connections.

FIG. 5 illustrates a typical outer glass-lined peripheral segment or tube [104] according to an embodiment of the present invention.

Referring to FIG. 5, the outer glass-lined segment [104] is a tube type structure comprising an outer wall (406) and inner wall (408) defining a jacketed section there between. The outer glass-lined tube [104] is provided with glass lining on inner surface of the inner wall [408]. In an embodiment, the outer glass-lined tube [104] comprising an inlet [401] and an outlet [405] for supplying the process fluid through interior region surrounded by the inner wall [408] and the outlet port [405] can be connected to the port [102] using flange [410]. The jacketed section of the outer glass-lined tube [104] comprising and inlet [402] and an outlet [403] for supplying the heat transfer fluid entering from the inlet [402] flows out through the outlet [403]. The outlet port [403] is connected to the inlet port [402] of another outer glass lined section [104] externally using flexible or inflexible connections.

FIG. 6 illustrates a typical connection port [102] according to an embodiment of the present invention.

Referring to FIG. 6, the connection port [102] comprises a solid metal block with glass lined inner surfaces [204] and [205]. The connection port is provided with suitable openings for connecting the connection port to the segments [104] and [105] using flanges [503] and [410] and using gaskets or o-rings [202] and [203], respectively. The port [102] may be provided with the one or more openings to single point or multi point feeding.

FIG. 7 illustrates a cross-section of the typical segment [104] assembled with segment [105] of the glass-lined tube-in-tube reactor assembly.

Referring to FIG. 7, heat transfer fluid flows [407] between the outer wall [406] and the inner wall [408] of the jacketed section of the outer glass lined segment [104]. The inner surface [409] of the inner wall [408] which does not touch the heat transfer fluid is glass-lined. The outer surface [508] of the outer tube [504] of the segment [105] i.e. the outer most surface [508] of the inner glass-lined insertion segment [105] is glass lined which comes in contact with the process fluid [600].

As can be observed from FIGS. 3 to 7, the inner glass lined segment is disposed in the outer glass lined segment so as to define an intermediate glass lined region through which the process fluid or reactant may be supplied. The heat transfer fluid may be supplied through the regions of the inner or outer segments other than the intermediate glass lined regions. The regions other than the intermediate glass lined regions are interior of the inner glass lined insertion segment [105] and the jacketed section of the outer glass lined segment [104].

In another preferred embodiment, the invention provides tube-in-tube continuous glass-lined metal reactor comprises at least two concentric tubes, wherein the heat transfer fluid flows within component and [and the reactant flow between the inner and outer glass lined tubes or their annulus, wherein the metal surfaces that come in contact with said reactant are lined with glass.

The metal part used in reactor of the present invention can be used by metal selected from the group consisting of Mild steel, stainless steel, carbon steel and other metal alloys. The connection port [102] can be made of metal selected from the group consisting of Mild steel, stainless steel, carbon steel and other metal alloys The novel features of the invention also include continuous flow, tube-in-tube type tubular glass-lined reactor or an assembly of immersed network of glass-lined tubes for heat transfer. The reactor can be easily assembled and capacity can be enhanced by numbering-up.

In yet another embodiment, the instant device is characterized for developing a specification chart comprising of heat and mass transfer coefficients, pressure drop, power consumption over a range of operating conditions for single phase as well as multiphase flows (gas-liquid, liquid-liquid, gas-liquid-liquid, liquid-solid, etc.). The device can be tested for single phase and multiphase exothermic and endothermic reactions.

In yet another embodiment, the instant design can be fabricated in macro and micro reactor forms.

It will be evident to those skilled in the art that the invention is not limited to the details of the foregoing illustrative examples and that the present invention may be embodied in other specific forms without departing from the essential attributes thereof, and it is therefore desired that the present embodiments and examples be considered in all respects as illustrative and not restrictive.

EXAMPLES

The invention is described in detail with reference to the examples given below which should not however be construed to limit the scope of the present invention.

Example 1

The disclosed glass lined reactors will have heat transfer area in the range of 300 to 500 $m^2/m^3$ as the reacting fluid flows through the annulus and hence gets the heat transfer area from both sides of the annulus. The plot of FIG. 14 shows the values of the heat transfer area per unit volume vs. volume of the standard glass lined stirred tank reactor and the glass-lined tube-in-tube reactor (single as well as multiple (100) achieved by using more in number). Small gap (1 cm) and large gap (2 cm) refer to the gap in the annulus between [408] and [504].

Example 2

Pressure drop data for process side fluid for the configuration shown in FIG. 3 is as follows:

| Flow rate, LPM | Pressure Drop, bar |
|---|---|
| 1.8789 | 0.022 |
| 2.733 | 0.055 |
| 3.2131 | 0.070 |
| 3.4742 | 0.087 |
| 3.8818 | 0.106 |
| 4.4444 | 0.136 |
| 4.9059 | 0.17 |

This data indicates that the invention disclosed here easily allows energy dissipation of 3 to 5 kW/m$^3$ of process fluids. This is significantly higher than the usual power dissipation practiced with glass lined stirred reactors.

Example 3

The disclosed design provides very good heat transfer performance for the glass lined reactor. A sample of heat transfer data is as follows:

| Mass Flow rate (Hot side)(kg/s) | Mass flow rate (Cold side)(kg/s) | Uh, W/m2 K |
|---|---|---|
| 0.0727 | 0.0328 | 400 |
| 0.0727 | 0.0505 | 416 |
| 0.0727 | 0.081 | 428 |
| 0.088 | 0.0983 | 489 |
| 0.096 | 0.0983 | 702 |
| 0.1 | 0.0365 | 519 |
| 0.133 | 0.0983 | 711 |

ADVANTAGES OF INVENTION

The reactor retains agility, modularity and re-configurability of the continuous chemical processes with improved processing ability.
The composite glass lined metal reactor can handle toxic and corrosive chemicals (gases and liquids)
High heat transfer area for continuous flow operation.

The invention claimed is:

1. A tube in tube type continuous glass-lined metal reactor, comprising:
   a) an outer glass lined segment;
   b) an inner glass lined segment disposed in the outer glass lined segment, thereby defining an intermediate region between the inner glass lined segment and the outer glass lined segment,
   wherein reactant flows through the intermediate region and a heat transfer fluid flows through regions other than the intermediate region between the outer glass lined segment and the inner glass lined segment; and,
   a port that assembles said inner glass-lined segment with said outer glass lined segment, said port comprising one or more openings for single point or multi point feeding, and a member with glass lined inner surfaces connected to the inner glass lined segment and the outer glass lined segment.

2. The tube in tube type continuous glass-lined metal reactor as claimed in claim 1, wherein the outer glass lined segment has a tubular construction, comprising:
   an outer wall and
   an inner wall defining a jacketed section there between and the jacketed section comprises an inlet and outlet for supplying heat transfer fluid.

3. The tube in tube type continuous, glass-lined metal reactor as claimed in claim 2, wherein the outer glass-lined segment is provided with glass lining on inner surface of the inner wall.

4. The tube in tube type continuous glass-lined metal reactor as claimed in claim 2, wherein the outer glass lined segment comprises an inlet and an outlet for supplying the process fluid through interior region surrounded by the inner wall.

5. The tube in tube type continuous glass-lined metal reactor as claimed in claim 1, wherein the inner glass-lined segment has a tubular construction comprising an outer tube and a straight inner tube being inserted in the outer tube so as to define an annular section there between.

6. The tube in tube type continuous glass-lined metal reactor as claimed in claim 5, wherein the outer surface of the outer tube of the inner glass-lined segment is provided with glass lining.

7. The corrosion resistant, tube in tube in tube continuous glass-lined metal reactor as claimed in claim 1, wherein the regions of outer glass lined segment and the inner glass lined segment through which the heat transfer fluid flows provides heat transfer area at least 300 m$^2$/m$^3$, for use in single phase and multiphase exothermic and endothermic reactions.

8. The corrosion resistant, tube in tube in tube continuous glass-lined metal reactor as claimed in claim 1, wherein the reactor comprises periodic and aperiodic sequence of assembly of the outer and inner segments.

9. The corrosion resistant, tube in tube in tube continuous glass-lined metal reactor as claimed in claim 1, wherein the port is made of metal selected from the group consisting of Mild steel, stainless steel, carbon steel and other metal alloys.

10. The corrosion resistant, tube in tube in tube continuous glass-lined metal reactor as claimed in claim 1, wherein the reactor is fabricated in macro and micro form.

* * * * *